(12) United States Patent
Palyutina et al.

(10) Patent No.: US 11,411,963 B2
(45) Date of Patent: Aug. 9, 2022

(54) NETWORK ACCESS SHARING

(71) Applicant: Nokia Technologies Oy, Espoo (FI)

(72) Inventors: Karina Palyutina, Cambridge (GB); Troels Roennow, Cambridge (GB); Enrique Martín López, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 321 days.

(21) Appl. No.: 16/485,385

(22) PCT Filed: Feb. 13, 2017

(86) PCT No.: PCT/FI2017/050080
§ 371 (c)(1),
(2) Date: Aug. 12, 2019

(87) PCT Pub. No.: WO2018/146373
PCT Pub. Date: Aug. 16, 2018

(65) Prior Publication Data
US 2019/0386832 A1 Dec. 19, 2019

(51) Int. Cl.
*H04L 29/06* (2006.01)
*H04L 9/40* (2022.01)
(Continued)

(52) U.S. Cl.
CPC .......... *H04L 63/123* (2013.01); *H04L 9/3239* (2013.01); *H04L 9/3247* (2013.01);
(Continued)

(58) Field of Classification Search
None
See application file for complete search history.

(56) References Cited

U.S. PATENT DOCUMENTS 10,412,171 B2 * 9/2019 Haleem ............... H04L 12/4625
10,939,405 B1 * 3/2021 Haleem ................ H04L 9/3255
(Continued)

FOREIGN PATENT DOCUMENTS

EP  2876856 A1  5/2015
GB  2540977 A   2/2017
(Continued)

OTHER PUBLICATIONS

Poon et al., "The Bitcoin Lightning Network: Scalable Off-Chain Instant Payments", Lightning Network, Jan. 14, 2016, pp. 1-59.
(Continued)

*Primary Examiner* — Jeffery L Williams
(74) *Attorney, Agent, or Firm* — Laine IP Oy

(57) ABSTRACT

According to an example aspect of the present invention, there is provided a method, comprising: detecting, by a first wireless device, a locally accessible second wireless device, sending a request to the second device for network access via the second wireless device, setting network access terms with the second wireless device for temporary provision of network access for the first wireless device via the second wireless device, exchanging a set of bilateral transactions with the second wireless device for the network access, each of the transactions being associated with a network access resource provided by the second wireless device for the first wireless device according to the set access terms, and causing provision of a public transaction on the basis of the set of bilateral transactions to be distributed within a blockchain network.

16 Claims, 5 Drawing Sheets

(51) Int. Cl.
*H04L 9/32* (2006.01)
*H04L 67/51* (2022.01)
*H04W 12/069* (2021.01)
*H04W 12/084* (2021.01)

(52) U.S. Cl.
CPC ........ *H04L 9/3297* (2013.01); *H04L 63/0823* (2013.01); *H04L 67/16* (2013.01); *H04W 12/069* (2021.01); *H04W 12/084* (2021.01); *H04L 2209/38* (2013.01)

(56) References Cited

U.S. PATENT DOCUMENTS

| | | | |
|---|---|---|---|
| 11,055,658 B2* | 7/2021 | Jacobson | G06Q 10/087 |
| 2006/0031515 A1 | 2/2006 | Van Gassel et al. | |
| 2016/0098730 A1 | 4/2016 | Feeney | |
| 2016/0224977 A1 | 8/2016 | Sabba et al. | |
| 2016/0259923 A1* | 9/2016 | Papa | H04W 12/08 |
| 2016/0259937 A1 | 9/2016 | Ford et al. | |
| 2017/0017936 A1* | 1/2017 | Bisikalo | G06Q 20/065 |
| 2017/0083907 A1* | 3/2017 | McDonough | G06Q 20/3829 |
| 2017/0346907 A1* | 11/2017 | Clawsie | H04W 48/16 |
| 2019/0208422 A1* | 7/2019 | Haleem | H04L 9/12 |
| 2019/0349254 A1* | 11/2019 | Nolan | H04L 69/18 |
| 2019/0370624 A1* | 12/2019 | Khoche | B65C 9/1869 |
| 2019/0386832 A1* | 12/2019 | Palyutina | H04L 63/123 |
| 2020/0050494 A1* | 2/2020 | Bartfai-Walcott | G06F 9/5083 |
| 2020/0092383 A1* | 3/2020 | Clawsie | H04L 67/16 |
| 2021/0126826 A1* | 4/2021 | Nolan | H04L 69/22 |

FOREIGN PATENT DOCUMENTS

| | | |
|---|---|---|
| WO | 2013/154517 A1 | 10/2013 |
| WO | 2017/004527 A1 | 1/2017 |
| WO | 2017/011601 A1 | 1/2017 |

OTHER PUBLICATIONS

"How to Share Your Smartphone's Internet Connection: Hotspots and Tethering Explained", How-To Geek, Retrieved on Jul. 4, 2019, Webpage available at: https://www.howtogeek.com/213329/how-to-share-your-smartphones-internet-connection-hotspots-and-tethering-explained/.

International Search Report and Written Opinion received for corresponding Patent Cooperation Treaty Application No. PCT/FI2017/050080, dated May 26, 2017, 17 pages.

* cited by examiner

NETWORK ACCESS SHARING

RELATED APPLICATION

This application was originally filed as Patent Cooperation Treaty Application No. PCT/FI2017/050080 filed Feb. 13, 2017.

FIELD

The present invention relates to network access sharing, and in particular to facilitating leasing of network access between wireless devices.

BACKGROUND

Consumers may be willing to gain wireless access to the Internet using the wireless connectivity of a nearby device. This can apply to many situations, such as having consumed the data allowance from your provider, or being in a country in which your tariff does not include roaming allowance. Suppose that Bob has mobile data and wireless connectivity capabilities, particularly Wi-Fi hotspot, and maybe others such as Bluetooth. Alice has no mobile data access (or severely limited access), and wishes to borrow access from Bob. Thus, Bob may provide access to Alice via Bluetooth or Wi-Fi hotspot functionality. There is, however a need for improvements for further facilitating temporary wireless access leasing.

SUMMARY

The invention is defined by the features of the independent claims. Some specific embodiments are defined in the dependent claims.

According to a first aspect of the present invention, there is provided a method comprising and an apparatus for detecting, by a first wireless device, a locally accessible second wireless device, sending a request to the second device for network access via the second wireless device, setting network access terms with the second wireless device for temporary provision of network access for the first wireless device via the second wireless device, exchanging a set of bilateral transactions with the second wireless device for the network access, each of the transactions being associated with a network access resource provided by the second wireless device for the first wireless device according to the set access terms, and causing provision of a public transaction on the basis of the set of bilateral transactions to be distributed within a blockchain network.

According to a second aspect of the present invention, there is provided a method comprising and an apparatus for receiving, by a second device from a first device, a request for network access via the second wireless device, setting network access terms with the first wireless device for temporary provision of network access for the first wireless device via the second wireless device, exchanging a set of bilateral transactions with the first wireless device for the network access, each of the transactions being associated with a network access resource provided by the second wireless device for the first wireless device according to the set access terms, and causing provision of a public transaction on the basis of the set of bilateral transactions to be distributed in a blockchain network.

According to an example embodiment, the apparatus is caused to operate as a blockchain node and update state of the blockchain on the basis of the set of bilateral transactions.

According to another example embodiment, a bilateral transaction is issued by the first device in response to obtaining a predetermined data amount or time of network access by the second device according to the set terms.

According to a still further example embodiment, the bilateral transactions are blockchain transactions indicating history of earlier bilateral transactions and comprise a timestamp and a digital signature generated by a secret encryption key of issuing device.

EMBODIMENTS

Figure 1:
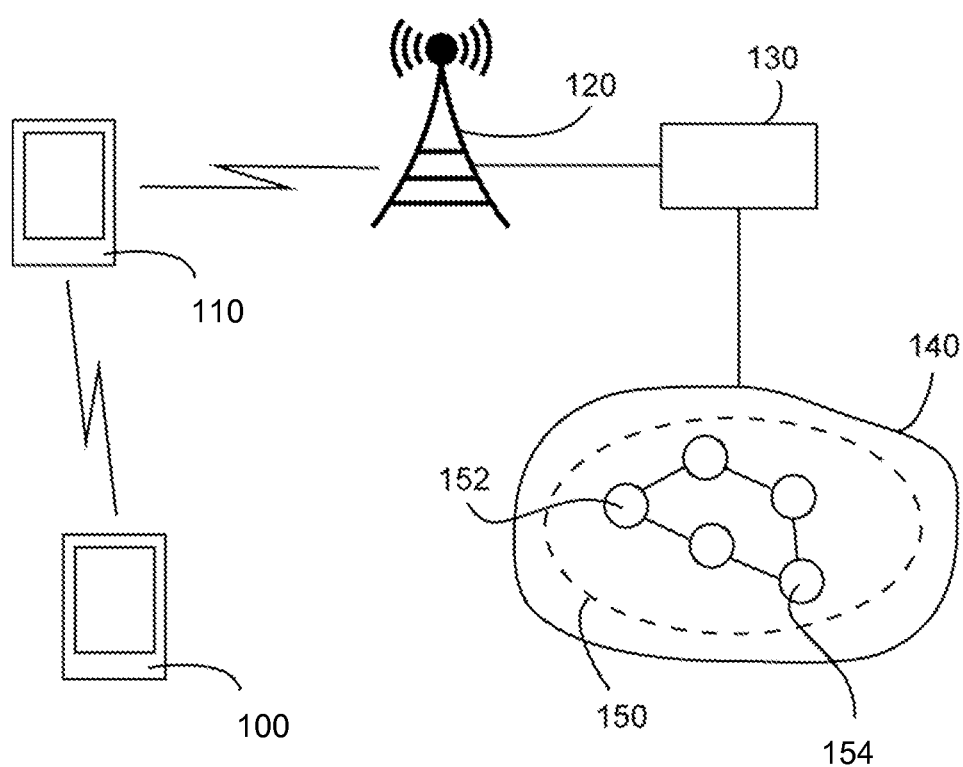
FIG. 1 illustrates an example system capable of supporting at least some embodiments of the present invention.

FIG. 1 illustrates an example scenario system, in which a first wireless device 100 may connect a second wireless device 110. The second wireless device 110 is connected to an access node 120, such as a local wireless network node and via one or more further network elements 130 to other networks 140, such as the Internet. The second device 110 may be willing to lease network access for the first device 100, which may also be referred to as access receiver device, for example. The first device 100 and/or the second device 110 may connect a blockchain network 150 and blockchain network nodes 152, 154 via or in the network 140. The wireless devices may be user devices, such a computer (PC), a laptop, a tablet computer, a cellular phone, a palm computer, or any other apparatus provided with radio communication capability.

The first device 100 and/or the second device 110 may also be blockchain nodes. They may operate as nodes with mining capabilities, or light nodes requiring less data processing resources.

According to some embodiments of the present invention, a solution utilizing blockchain features is provided, enabling wireless peer devices to lease their network connection to other wireless peer devices.

Figure 2:
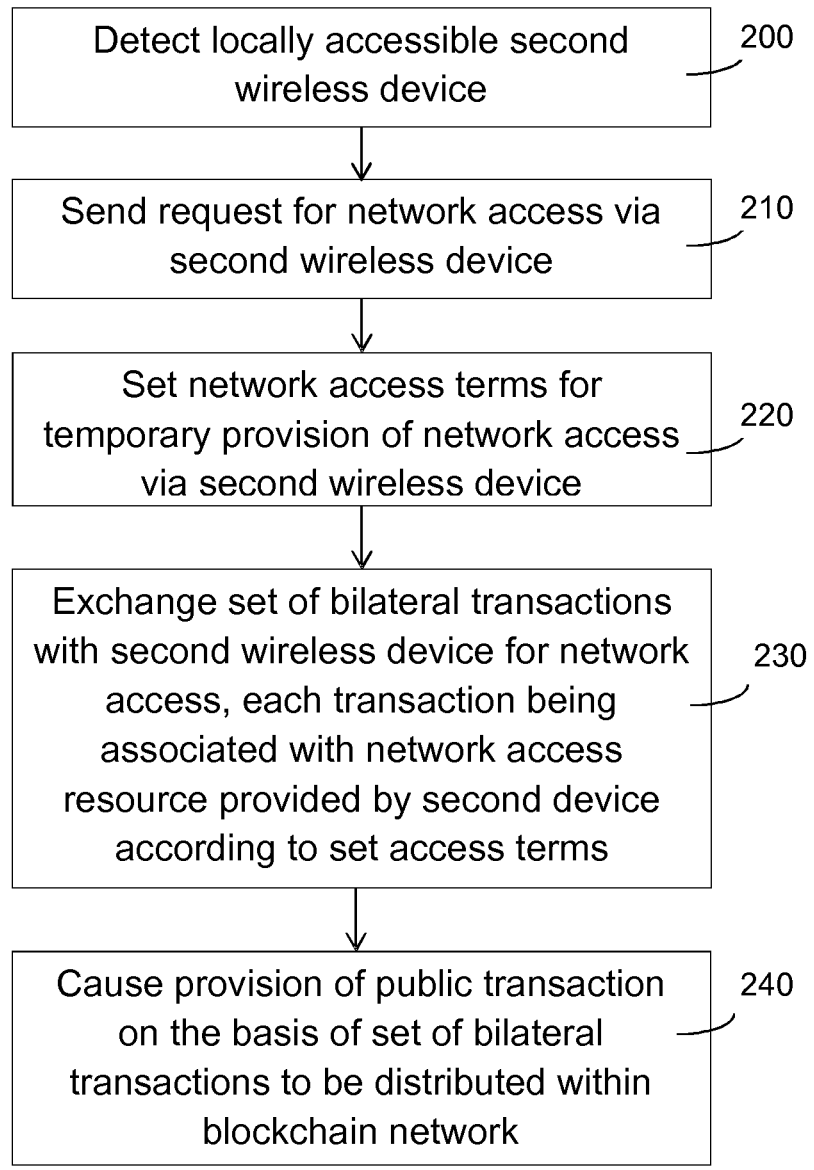
FIG. 2 illustrates a method in accordance with at least some embodiments of the present invention.

FIG. 2 illustrates a method according to some embodiments. The method may be applied in a device needing network access, such as the first wireless device 100. The first wireless device detects 200 a locally accessible second wireless device and sends 210 a request to a second device for network access via the second wireless device. Network access terms are set 220 with the second wireless device for temporary provision of network access for the first wireless device via the second wireless device. This generally refers to the first device and the second device agreeing on parameters associated with the provision of the network access, such as some or all of time, data amount, bandwidth, and compensation.

A set of bilateral transactions is exchanged 230 with the second wireless device for the network access. Each of the transactions is associated with a network access resource provided by the second wireless device for the first wireless device according to the set access terms. The association can generally refer to a bilateral transaction being established upon or to account for particular network access resource, such as predefined time or data amount, to be provided or having been provided to the first wireless device according to the access terms. The transaction as such does not necessarily have to identify the network access (resource). The exchange of such associated bilateral transactions generally refers to sending and/or receiving by the first device and/or the second device a transaction record generated on the basis of or for the network access. A public transaction is prepared and provided 240 to be distributed within a blockchain network on the basis of the set of bilateral transactions, the public transaction referring to a transaction to be available in the blockchain network.

Figure 3:
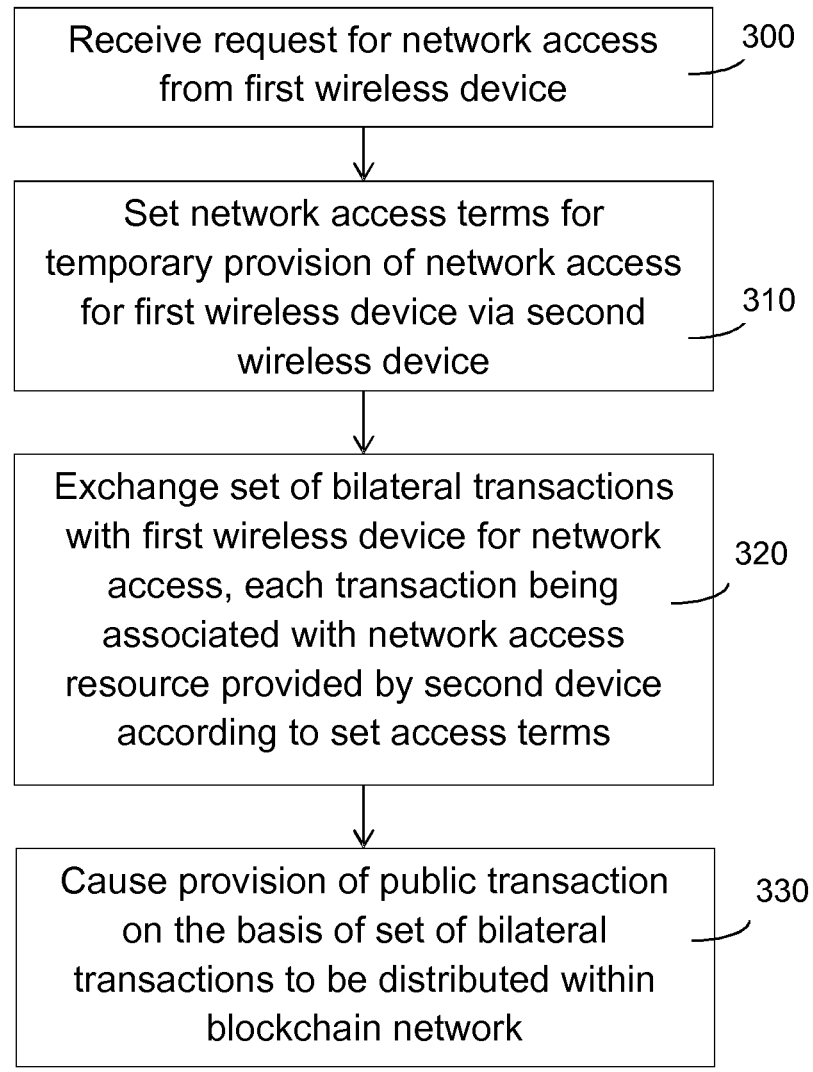
FIG. 3 illustrates a method in accordance with at least some embodiments of the present invention.

FIG. 3 illustrates a method according to some embodiments. The method may be applied in a device capable of temporarily providing network access for another device, such as the second device 110.

The second device receives 300 from a first device a request for network access via the second wireless device. Network access terms are set 310 with the first wireless device for temporary provision of network access for the first wireless device via the second wireless device. A set of bilateral transactions is exchanged 320 with the second wireless device for the network access, each of the transactions being associated with a network access resource provided by the second wireless device for the first wireless device according to the set access terms. A public transaction is prepared and provided 330 to be distributed within a blockchain network on the basis of the set of bilateral transactions.

A channel may be established between the first wireless device 100 and the second wireless device for exchanging 230, 320 the transactions. The first device may issue a bilateral transaction in response to obtaining a predetermined data amount or time of network access by the second device according to the set terms.

The bilateral transactions may be blockchain transactions indicating history of earlier bilateral transactions. The bilateral transaction may comprise a timestamp and a digital signature generated by a secret encryption key of issuing device.

Hence, unused or partly used wireless network access resources may be dynamically and in automatic fashion be leased to other devices. Small bilateral transactions may be exchanged between the first device and the second device, but rest of the blockchain network does not need to know about all of them. Instead several transactions may be batched together into one transaction broadcast to the blockchain, enabling a light mechanism to directly compensate the second device for provided the network access. This also enables to reduce the amount of transactions and related processing required at the blockchain. The bilateral transactions can be exchanged outside the blockchain, thus such dedicated network is not required, but available local communications. It is not required to have specific authentication mechanism or third party for trust establishment and the devices may remain anonymous. Further, the first device does not have to have access to network initially.

Innovative decentralized data storage solutions, such as blockchains enable provenance and avoid the need to rely on centralized third parties to regulate information and data systems. Blockchain features may be utilized to create a smart contract between the wireless devices 100, 110 with distributed consensus, without requiring a third party to manage the protocol.

A blockchain is a distributed computing architecture where network nodes executes and records the same transactions, which are grouped into blocks. Only one block can be added at a time, and every block contains a mathematical proof that verifies that it follows in sequence from the previous block. In this way, the blockchain's distributed database is kept in consensus across the whole network, and this is achieved without the need of a central authority. Nodes that maintain and verify the network are incentivized by mathematically enforced economic incentives coded into the protocol. The blockchains can work in different ways, as well as in different scales. Apart from keeping an immutable, comprehensive record of events, to be conveniently acted upon, blockchains offer security in a complex network by accommodating consensus algorithms that are mathematically hard to corrupt.

The nodes 100, 110, 152, 154 may comprise corporate, authority, and/or user devices, such as a server, a desktop/tablet/laptop computer, smartphone, set-top box or other suitable electronic device. The system may comprise an administrator or management node, a hub, relay or other kind of intermediate device for connecting a node to further networks or services, such as another distributed or centralized computing system or a cloud service. The nodes are mutually addressable in a suitable way, for example, they may be connected to an internet protocol, IP, network. Messages released into the IP network with a recipient address are routed by the network to the recipient node identified by the recipient address. IP is not the only suitable networking technology used, for example, other peer-to-peer networking models are also suitable.

The blockchain state information shared by the nodes may store all the transactions and history carried out in the network. The blockchain state information is stored in or as a blockchain ledger. By distributed block chain ledger it is meant a blockchain ledger that is not centralized, and copies of the blockchain are stored in participating nodes. Once a new block is established, it is copied among the participating nodes to maintain the copies of the block chain up to date. The nodes may validate and commit transactions in order to reach consensus. Each node may have their own copy of the ledger which is in some embodiments permission-controlled, so participants see only appropriate transactions.

Changes in resource ownership in a blockchain take the form of transactions secured by strong cryptography. A transaction may comprise a transfer or grant of resources, or rights, to a recipient account. In general, a blockchain transaction may be considered to be information stored in a block in a blockchain. A transaction may involve two parties and a resource. A transaction may comprise a data structure or message, which comprises an identifier and/or quantity of the resource to be transferred or right to be granted, an identifier of a recipient or user account and a cryptographic signature of the sender or granter. Depending on the system, a sender or granter account may also be identified in the transaction. Thus, the cryptographic signature, which may be created using a private key of the sender, guards against theft of the resource or right, since only the sender or granter is in possession of the private key. Application of blockchain technology and the ledger enable a way to track the unique history of transactions by the individual nodes in the network.

To establish the next block, the transactions are broadcast into the network. Broadcasting here refers to a dissemination method suitable for the context, which will cause the transactions to be communicated to the nodes of the network in general. Reaching each and every node with each and every transaction is not strictly necessary. A node establishing the next block may be known as a miner node. A miner node may compile a set of transactions, which it receives from the broadcasts, for the next block, and search for a proof-of-work code that covers all the transactions in the set of transactions for the next block. For example, the proof-of-work code may be a numerical value, with which the contents of the next block, that is, the set of transactions, hashes to a value that is less than a threshold. More generally, there may be a target area of an output space of a hash function, wherein the target space need not be in the low end of the target space. The smaller the target area is, the more difficult it is to discover the proof-of-work. Once a miner discovers the proof-of-work, it can publish the block, which other nodes of the system will then add to the block chain as the new most recent established block.

In case the miner node discovers a proof-or-work based on an incomplete set of transactions, for example if some transactions did not reach the miner node, other nodes in the network will not accept the block into the blockchain, and it will be excluded from a consensus version of the block chain in the system.

Since an output of a hash function is a pseudorandom function of the input, the set of transactions, hashed by itself, produces a hash value that is essentially randomly placed in the output space of the hash function. The set of transactions may be completely or representatively present as input to the hash function. Modifying the input with a candidate proof-of-work code, which may be known as a nonce, will produce a new hash value, which again is essentially randomly placed in the output space of the hash function. The modification may be as slight as a single bit. Therefore, searching for the correct proof-of-work code, which satisfies a pre-agreed criterion concerning its location in the output space of the hash function, requires repeatedly deriving a hash value with a different candidate proof-of-work code modifying the input to the hash function. Once a proof-of-work code that, with the transactions, produces a hash value in the target area of the output space of the hash function is found, the block is ready. A completed block may be distributed to the system to establish it in the blockchain. Although discussed above in terms of proof-of-work, in some embodiments a proof-of-stake may be used instead of, or additionally to, a proof-of-work. In a proof-of-stake based system, a new block is accepted once a sufficient fraction of resources are proven as owned by nodes ready to accept the new block version.

Once a new block is established, the blockchain becomes longer. A transaction is considered the more reliable, the larger the number of blocks established since the block where the transaction is comprised. This is so, since transactions are hashed into the chain of blocks, and discrepancies in the block chain are resolved as the block chain gets longer. In each next block in the sequence, a hash of the previous block may be included along with the transactions, attaching the blocks to each other to form the chain. Hashes linking the blocks together to form a chain may be referred to as Merkle hashes. Maliciously modifying a transaction in a block far down the chain would involve re-doing the work of finding proofs for all subsequent blocks, since the input to the hash function for the block comprising the transaction would be changed, causing the resulting hash value, with the proof in that block, to no longer be disposed in the desired area in the output space of the hash function.

Figure 4:
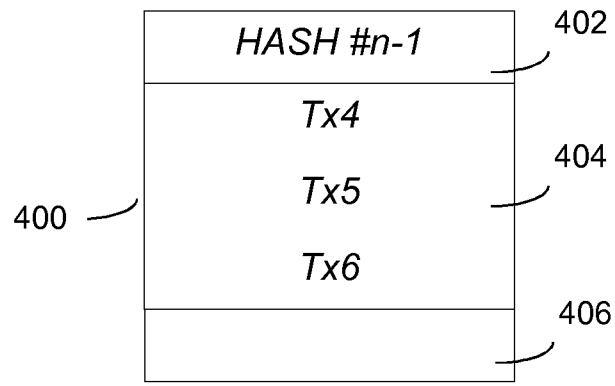
FIG. 4 illustrates an example of a transaction record in accordance with at least some embodiments of the present invention.

FIG. 4 illustrates a simplified example of a blockchain transaction record n 400 generated based on a set of bilateral transactions carried out 230, 320 between the first device 100 and the second device 110 upon the first wireless device providing the network access to the second device according to the set terms. The transaction may be the public transaction provided 240, 330 to the blockchain 150 and stored as a new record in the ledger. The record comprises data 404 on the set of bilateral transactions Tx4, Tx5, Tx6 and a hash pointer 402 to previous block n-1 of the chain. The data 404 comprising the set of bilateral transactions may be considered as the blockchain transaction and signed by the first device 100 or the second device 110 providing the transaction to the blockchain.

The record may comprise also further information element(s) 406, such as timestamp. In some embodiments, the blockchain transaction record 400 may comprise an identifier of an ephemeral 2-of-2 multi-signature account between the first device and the second device. The identifier may be derived e.g. from the first device's public key, the second device's public key, and/or a timestamp using a hashing function.

The transaction record 400 may also include the signatures of both the first device 100 and the second device 110. The signatures may be for the ephemeral account's ID, showing that they both recognize it as the temporary holder (netting) of the microtransactions carried out in the protocol.

Figure 5:
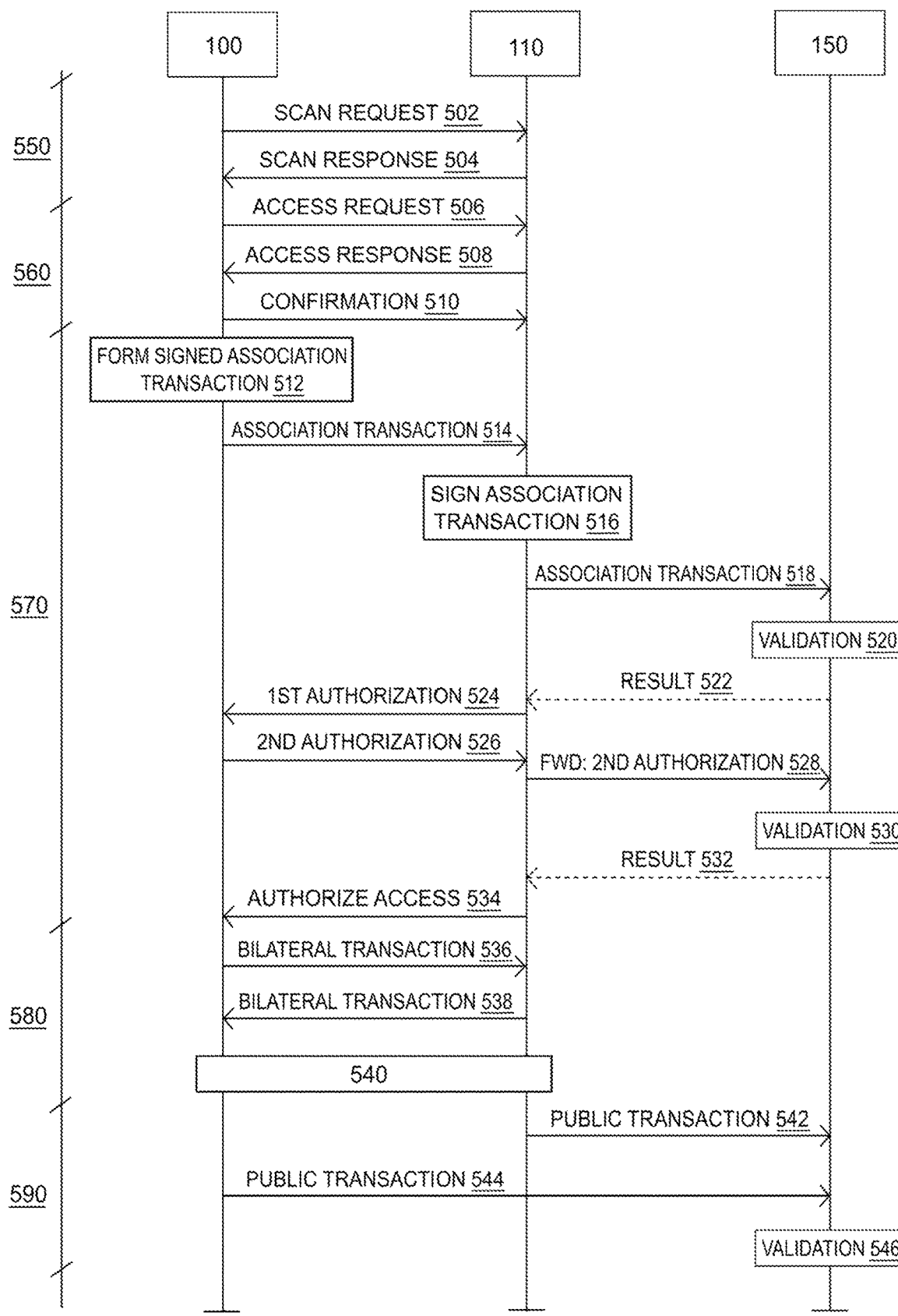
FIG. 5 shows an example signalling chart in accordance with at least some embodiments of the present invention.

The transaction record 400 may further include a record of the conditions established between the first device 100 and the second device 110 for the provision of the (network access) service, such as initial time, payment rate, or bandwidth allocation. The transaction may also include a summary of the time and data allocation involved in the overall service provision. In an embodiment, the transaction may comprise a net currency transaction amount from the first device 100 to the second device 110 for the service provision. The transaction information may be signed by the first device and may become the only piece of information that affects the state of the blockchain in terms of currency balances. Some further examples on providing the bilateral and public transactions are illustrated below. Some further embodiments are now illustrated with reference also to FIG. 5. During a discovery phase 550, the first device 100 may search for available wireless devices by performing a local scanning operation, such as a Wi-Fi or Bluetooth scan, which may involve sending a scanning request 502 or a similar message to locate locally available devices. This operation may be initiated automatically e.g. when an input is detected from a user of the first device requiring network access. The second device 110 receives and responds 504 to the request.

In some embodiments, already the scanning response 504 may indicate availability of the second device 110 to provide or lease network access to other wireless devices. The second device may advertise such capability or availability also proactively and the first device may detect 200 the second device based on such pushed advertisement. In some embodiments, a register may be maintained that keeps track of hotspot locations together with preferred method for leasing the connection and this information is provided to wireless devices 100.

During a setup phase 560, upon detecting the availability of the second device 110 (step 200 in FIG. 2), the first device may send an access request 506 indicating request for network access via the second device (200). This may be carried out through an appropriate wireless channel, such as an open peer-to-peer (P2P) Wi-Fi hotspot or Bluetooth. The access request may include parameters on the desired or acceptable terms for the network access, such as some or all of coverage, time, bandwidth, and compensation. The second device sends an access response 508, which may indicate network access terms by which the second device is willing to provide the network access and establish a blockchain based relationship for the first device. The first device checks if the terms are acceptable and if so, responds with confirmation 510. The first device may be pre-configured with acceptable terms or term ranges and/or an input may be requested from the user.

Devices may thus in the setup phase 560 reach an agreement based on both what the first device 100 can offer and what the second device 110 is willing to accept. If the automatic agreement is not possible, e.g. due to price mismatch or the device 100, 110 moving out of range, the discovery 550 may be started again to find another peer, or communication establishment is terminated. Ground rules may thus be established in a partly or completely automatic manner for a smart contract to deployed on the blockchain platform.

During a blockchain association phase 570, a blockchain association transaction for establishing a joint account to the blockchain network 150 may be generated. The transaction may be issued and signed 512 by the first device, sent 514 to the second device, signed 516 by the second device, and sent 518 to the blockchain network by the second device 110.

The association transaction may be a signed blockchain transaction TX1 to create a 2-of-2 multi-signature account. For example, when the first device 100 represents Alice and the second device 110 represents Bob, the TX1 may be defined as initialization including the public encryption keys of Alice and Bob:

TX1=init(Public_Key(Bob), Public_Key(Alice))

The second device 110 may send the association transaction to the blockchain ledger. Mining nodes of the blockchain network 150 validate 520 the transaction and verify that both devices wish to create a joint account. Notice that no one has an incentive to refuse to sign at this stage. After validation, the new transaction may be added in a new block to the blockchain. The second device may receive result 522 of the validation process by receiving the updated ledger and hence detect that the joint account has been created.

The second device 110 may send a first signed authorization transaction 524 authorizing the first device 100 to receive tokens of the joint account in response to receiving the result 522 of the validation for the transaction for establishing the joint account. Such token may be cryptocurrency value or other type of token.

Because the first device 100 does not yet have network access, it may send to the second device 110 a signed second authorization transaction 526 authorizing initial amount of tokens to the joint account in response to receiving the first signed authorization 524 from the first device.

The second device 110 receives the signed second authorization transaction 526 for initial amount of tokens to the joint account. It is in the interest of the second device 110 to forward the transaction and it cannot tamper with it, as the transaction is signed with a private key of the second device. Hence, the second authorization transaction is forwarded 528 for validation 530 and to be distributed in the blockchain network 150.

In response to detecting 532 validation 530 of the second authorization transaction, the second device 110 may authorize and provide 534 network access for the first device 100. For example, the second device 110 may simply authorize connectivity for first device's identifier, such as registered medium access control (MAC) address, and communication can happen over the Wi-Fi direct standard. In another example embodiment, the first device 100 obtains access credentials, such as one-time password or other temporary access token, from the second device 110, and network access is enabled in response to such credentials. For example, such access credentials may be applied to provide a dedicated hotspot connection by Bluetooth or another short-range radio technology.

The first device 100 may then during bilateral transaction phase 580 use the network access to access the Internet, for example. The first device may issue a bilateral transaction 536 in response to using a given network access resource provided by the second device 110, such as predetermined time or amount. The bilateral transaction may indicate authorization of the first device to compensate the second device at the established blockchain account, by releasing a set amount of tokens for the second device, according to the set network access terms. The second device 110 may respond by its bilateral transaction 538, which may indicate authorization by the second device for the first device to receive the remaining value or tokens at the account. Such exchange of bilateral transactions 540 may continue until end of the network access provision for the first device 100.

During a network access completion or blockchain update phase 590, the latest bilateral transaction accumulating previous bilateral transactions is provided 240, 330; 542, 544 to be distributed by the first device 100 and/or the second device 110 to the blockchain network. This may be carried out already before the termination or after the network access has been terminated. It is to be noted that also intermediary bilateral transactions may be provided during the active network access to the blockchain network.

In some embodiments, the bilateral transactions are micropayment transactions and a micropayment channel is established between the first device and the second device for exchanging 230, 320 the bilateral transactions. Some example embodiments are further below illustrated, including references to FIG. 5, the first device 100 representing Alice and the second device 110 Bob.

The bilateral transactions 536 to 540 may thus comprise a signed authorization for micropayment from the first wireless device to the second wireless device and/or authorization from the second device for the first device to obtain the remaining value at the joint account. For example, micropayment channels may be utilize at least partly Lightning network features or Ethereum smart contracts.

The second authorization message 524 may be a signed authorization by Bob for Alice to receive initial amount from the joint account, such as:

TX2=pay(to: {Alice}, from: {Joint_Acc(Bob, Alice)}, initial_amount, time_limit)

Alice signs TX2, as it is in her best interest, but it is to be noted that TX2 524 would never be mined on the blockchain network 150 as it refers to an initial_amount that does not yet exist on the joint account. TX2 can only be effective if mined after the following TX3 526.

In some embodiments, a delay parameter is set for the first authorization transaction 524 delaying mining of the first authorization transaction. For example, the delaying may be set to a future block number estimated to occur after termination of the network access or the mining may be delayed by a time period exceed maximum allowed time of provision of the network access for the first device. The time_limit parameter in TX2 represents such delay parameter. For example, the time_limit parameter may define a block number expected 24 hours later.

Hence, it becomes possible to avoid double-spending attack, i.e. to prevent the second device to redeem the initial amount of tokens or cryptocurrency value at the account after being provided with the network access, before the second device 110 is duly compensated by validated blockchain transactions authorizing tokens from the first device to the second device.

Alice 100 signs TX3 authorizing a payment of initial_amount 526 to the joint account:

TX3=pay(to: {Joint_Acc(Bob, Alice)}, from: {Alice}, initial_amount)

When the TX3 528 is mined, Bob 110 can be sure that Alice 100 has reserved the funds to make a payment for the future data access. Conversely, Alice has a copy of a doubly signed TX2 that would allow her to retrieve the funds back from the joint account if Bob decided to withdraw from the exchange. She would however need to wait for TX3 528 to be mined to broadcast the TX2 to the blockchain network 150.

Alice uses Bob's network access and pays for the first batch of data by releasing funds in the joint account. To facilitate micropayments, Alice and Bob frequently privately exchange transactions 536, 538 of the form TX4=pay(to: Bob, from: {Joint_Acc(Alice, Bob)}, payment1); pay(to: Alice, from: {Joint_Acc(Alice, Bob)}, initial_amount-payment1)

In doing this, they both hold valid promises of Bob receiving payments for his data and Alice getting the remainder of the initial_amount back. For a subsequent micro batch of data, the private transaction will accumulate the payments:

TX5=pay(to: Bob, from: {Joint_Acc(Alice, Bob)}, payment1+payment2); pay(to: Alice, from: {Joint_Acc(Alice, Bob)}, initial_amount-payment1-payment2)

This way either Bob 110, 100 or Alice can broadcast the latest transaction 542, 544 to the ledger at any point. When devices get disconnected or choose to terminate the protocol, they simply broadcast the latest private transaction. All unused funds are returned to Alice and Bob gets paid.

In some embodiments, the first device 100 starts a discovery process to search for a third wireless device capable of sharing in response to the network access being terminated due to the second device.

An electronic device comprising electronic circuitries may be an apparatus for realizing at least some embodiments of the present invention and capable of carrying out at least some of the features illustrated above for the first device 100 or the second device 110. The apparatus may be or may be comprised in a computer, a laptop, a tablet computer, a cellular phone, a machine to machine (M2M) device (e.g. a sensor device), a wearable device, or any other apparatus provided with radio communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 6:
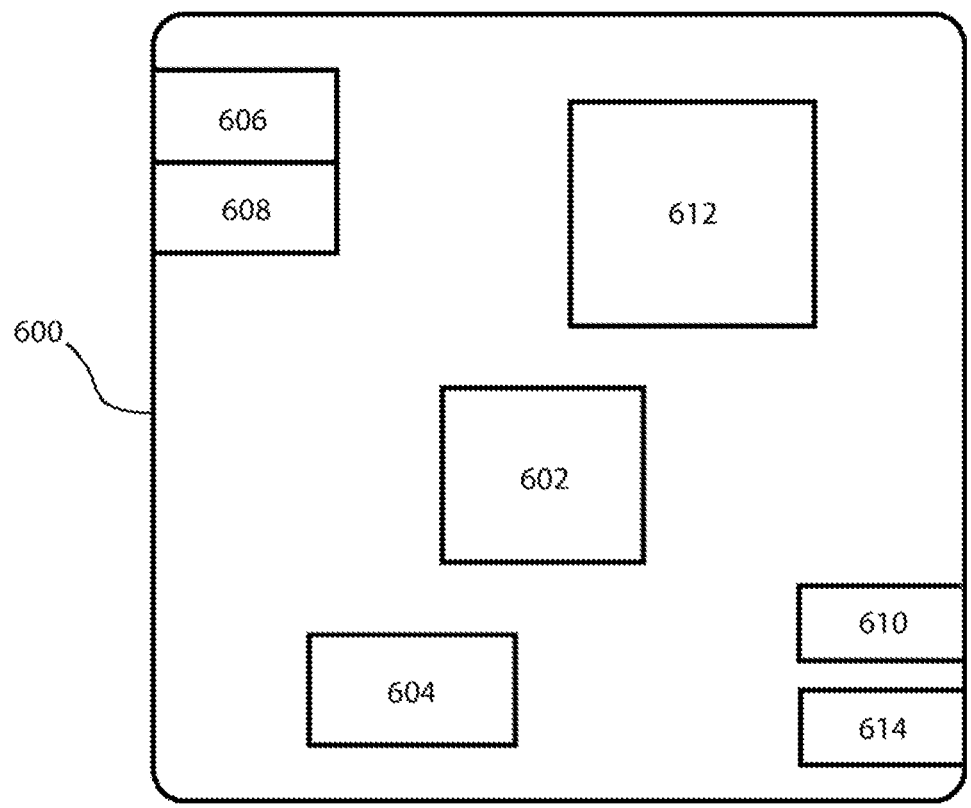
FIG. 6 an apparatus in accordance with at least some embodiments of the present invention.

FIG. 6 illustrates an example apparatus capable of supporting at least some embodiments of the present invention. Illustrated is a device 600, which may comprise a communications device arranged to operate as a node in a blockchain-based system. The device may be arranged to carry out at least some of the embodiments related to leasing network access by utilizing blockchain transactions as illustrated above. The device may be arranged to or comprise means for carrying out at least some of the features illustrated above for the first device 100 and/or the second device 110. The device may include one or more controllers configured to carry out operations in accordance with at least some of the embodiments illustrated above, such as some or more of the features illustrated in connection with FIGS. 2 to 5.

Comprised in the device 600 is a processor 602, which may comprise, for example, a single- or multi-core processor wherein a single-core processor comprises one processing core and a multi-core processor comprises more than one processing core. The processor 602 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 600 may comprise memory 604. The memory may comprise random-access memory and/or permanent memory. The memory may comprise at least one RAM chip. The memory may comprise solid-state, magnetic, optical and/or holographic memory, for example. The memory may be at least in part accessible to the processor 602. The memory may be at least in part comprised in the processor 602. The memory 604 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 600 but accessible to the device. Network state information, as well as control parameters affecting operations in the device may be stored in one or more portions of the memory and used to control operation of the device.

The device 600 may comprise a transmitter 606. The device may comprise a receiver 608. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, Third Generation Partnership Project (3GPP) new radio access technology (N-RAT), IS-95, wireless local area network, WLAN, Ethernet and/or worldwide interoperability for microwave access, WiMAX, standards, for example. The device 600 may comprise a near-field communication, NFC, transceiver 610. The NFC transceiver may support at least one NFC technology, such as NFC, Bluetooth, Wibree or similar technologies.

The device 600 may comprise user interface, UI, 612. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 604 or on a cloud accessible via the transmitter 606 and the receiver 608, or via the NFC transceiver 610, and/or to play games.

The device 600 may comprise or be arranged to accept a user identity module or other type of memory module 614. The user identity module may comprise, for example, a subscriber identity module, SIM installable in the device 600. The user identity module 614 may comprise information identifying a subscription of a user of device 600. The user identity module 614 may comprise cryptographic information usable to verify the identity of a user of device 600 and/or to facilitate encryption and decryption of data elements and communication effected via the device 600, such as the signing the transactions as illustrated above.

The processor 602 may be furnished with a transmitter arranged to output information from the processor, via electrical leads internal to the device 600, to other devices comprised in the device. Such a transmitter may comprise a serial bus transmitter arranged to, for example, output information via at least one electrical lead to memory 604 for storage therein. Alternatively to a serial bus, the transmitter may comprise a parallel bus transmitter. Likewise the processor may comprise a receiver arranged to receive information in the processor, via electrical leads internal to the device 600, from other devices comprised in the device 600. Such a receiver may comprise a serial bus receiver arranged to, for example, receive information via at least one electrical lead from the receiver 608 for processing in the processor. Alternatively to a serial bus, the receiver may comprise a parallel bus receiver.

The device 600 may comprise further devices not illustrated in FIG. 6. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 610 and/or the user identity module 614.

The processor 602, the memory 604, the transmitter 606, the receiver 608, the NFC transceiver 610, the UI 612 and/or the user identity module 614 may be interconnected by electrical leads internal to the device 600 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. The skilled person will appreciate that above-illustrated embodiments may be combined in various ways. Embodiments illustrated in connection with FIGS. 2 to 5 may be taken in isolation or further combined together. For example, some or all of the phases 550 to 590 may be utilized without the other phases in combination with another implementation.

Various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in communications.

ACRONYMS LIST

3GPP Third Generation Partnership Project
ASIC Application-specific integrated circuit
FPGA Field-programmable gate array
GSM Global system for mobile communication
IC Integrated Circuit
LTE Long term evolution
M2M Machine-to-machine
NFC Near-field communication
P2P Peer-to-peer
PoS Proof-of-stake
PoW Proof-of-work
UI User interface
WCDMA Wideband code division multiple access
WiMAX Worldwide interoperability for microwave access
WLAN Wireless local area network

The invention claimed is:

1. An apparatus comprising at least one processor, at least one memory including computer program code, the at least one memory and the computer program code being configured to, with the at least one processor, cause the apparatus at least to:
- detect, by a first wireless device, a locally accessible second wireless device and availability of the second wireless device to provide or lease network access to other wireless devices,
- send, by the first wireless device in response to detecting the availability of the second wireless device, a request to the second wireless device for network access via the second wireless device,
- receive an access response from the second wireless device, wherein the access response is indicative of network access terms by which the second wireless device is willing to provide the network access and establish a blockchain based relationship for the first device,
- set network access terms with the second wireless device for temporary provision of network access for the first wireless device via the second wireless device,
- send an association transaction for the blockchain network for establishing a joint account for the first device and the second device, the association transaction being signed by the first device by a secret cryptography key,
- receive from the second device a first signed authorization transaction authorizing the first device to receive tokens of the joint account after validation for the association transaction for establishing the joint account,
- send a second signed authorization transaction from the first device authorizing initial amount of tokens to the joint account in response to receiving the first signed authorization from the second device,
- exchange, by the first wireless device during use of the network access authorized and provided by the second wireless device, a plurality of bilateral transactions with the second wireless device for the network access, each of the transactions being associated with a network access resource provided by the second wireless device for the first wireless device according to the set access terms, and
- cause provision of a public transaction on the basis of the exchanged set of plurality of bilateral transactions to be distributed within a blockchain network, wherein the public transaction accumulates the exchanged set of plurality of bilateral transactions.

2. The apparatus of claim 1, wherein the at least one memory and the computer program code are configured to, with the at least one processor, cause the apparatus to establish a channel between the first device and the second device for exchanging the transactions.

3. The apparatus of claim 1, wherein the at least one memory and the computer program code are configured to, with the at least one processor, cause the apparatus to issue a bilateral transaction in response to obtaining a predetermined data amount or time of network access by the second device according to the set terms.

4. The apparatus of claim 1, wherein the bilateral transactions are blockchain transactions indicating history of earlier bilateral transactions and comprise a timestamp and a digital signature generated by a secret encryption key of an issuing device.

5. The apparatus of claim 1, wherein the at least one memory and the computer program code are configured to, with the at least one processor, cause the apparatus to set a delay parameter for the first authorization transaction delaying mining of the first authorization transaction to a future block number estimated to occur after termination of the network access or by a time period exceeding maximum allowed time of provision of the network access for the first device.

6. The apparatus of claim 1, wherein the bilateral transactions are micropayment transactions.

7. The apparatus of claim 6, wherein the bilateral transactions comprise at least one of signed authorization for micropayment from the first wireless device to the second wireless device and authorization from the second device for the first device to obtain the remaining value at the joint account.

8. The apparatus of claim 1, wherein the at least one memory and the computer program code are configured to, with the at least one processor, cause the apparatus to provide latest bilateral transaction accumulating preceding bilateral transactions to be distributed in the blockchain network in response to the network access being terminated.

9. The apparatus of claim 1, wherein the at least one memory and the computer program code are configured to, with the at least one processor, cause the apparatus to start a discovery process by the first device to search for a third wireless device capable of sharing in response to the network access being terminated due to the second device.

10. A method, comprising:
- detecting, by a first wireless device, a locally accessible second wireless device and availability of the second wireless device to provide or lease network access to other wireless devices,
- sending, by the first wireless device in response to detecting the availability of the second wireless device, a request to the second wireless device for network access via the second wireless device,
- receiving an access response from the second wireless device, wherein the access response is indicative of network access terms by which the second wireless device is willing to provide the network access and establish a blockchain based relationship for the first device,
- setting network access terms with the second wireless device for temporary provision of network access for the first wireless device via the second wireless device,
- sending an association transaction for the blockchain network for establishing a joint account for the first wireless device and the second wireless device, the association transaction being signed by the first wireless device by a secret cryptography key,
- receiving from the second wireless device a first signed authorization transaction authorizing the first wireless device to receive tokens of the joint account after validation for the association transaction for establishing the joint account,
- sending a second signed authorization transaction from the first wireless device authorizing initial amount of tokens to the joint account in response to receiving the first signed authorization from the second wireless device,
- exchanging, by the first wireless device during use of the network access authorized and provided by the second wireless device, a set of plurality of bilateral transactions with the second wireless device for the network access, each of the transactions being associated with a network access resource provided by the second wireless device for the first wireless device according to the set access terms, and
- causing provision of a public transaction on the basis of the exchanged set of plurality of bilateral transactions to be distributed within a blockchain network, wherein the public transaction accumulates the exchanged set of plurality of bilateral transactions.

11. The method of claim 10, wherein a channel is established between the first device and the second device for exchanging the transactions.

12. The method of claim 10, wherein a bilateral transaction is issued by the first device in response to obtaining a predetermined data amount or time of network access by the second device according to the set terms.

13. The method of claim 10, wherein the bilateral transactions are blockchain transactions indicating history of earlier bilateral transactions and comprise a timestamp and a digital signature generated by a secret encryption key of an issuing device.

14. The method of claim 10, wherein a delay parameter is set for the first authorization transaction delaying mining of the first authorization transaction to a future block number estimated to occur after termination of the network access or by a time period exceeding maximum allowed time of provision of the network access for the first device.

15. The method of claim 10, wherein the bilateral transactions are micropayment transactions.

16. A non-transitory computer readable medium having stored thereon a set of computer readable instructions that, when executed by at least one processor, cause an apparatus to:

detect, by a first wireless device, a locally accessible second wireless device and availability of the second wireless device to provide or lease network access to other wireless devices, send, by the first wireless device in response to detecting the availability of the second wireless device, a request to the second wireless device for network access via the second wireless device, receive an access response from the second wireless device, wherein the access response is indicative of network access terms by which the second wireless device is willing to provide the network access and establish a blockchain based relationship for the first device, set network access terms with the second wireless device for temporary provision of network access for the first wireless device via the second wireless device, send an association transaction for the blockchain network for establishing a joint account for the first device and the second device, the association transaction being signed by the first device by a secret cryptography key, receive from the second device a first signed authorization transaction authorizing the first device to receive tokens of the joint account after validation for the association transaction for establishing the joint account, send a second signed authorization transaction from the first device authorizing initial amount of tokens to the joint account in response to receiving the first signed authorization from the second device, exchange, by the first wireless device during use of the network access authorized and provided by the second wireless device, a plurality of bilateral transactions with the second wireless device for the network access, each of the transactions being associated with a network access resource provided by the second wireless device for the first wireless device according to the set access terms, and cause provision of a public transaction on the basis of the exchanged set of plurality of bilateral transactions to be distributed within a blockchain network, wherein the public transaction accumulates the exchanged set of plurality of bilateral transactions.

* * * * *